(12) United States Patent
Nishimoto et al.

(10) Patent No.: US 12,404,363 B2
(45) Date of Patent: Sep. 2, 2025

(54) EPOXY RESIN COMPOSITION AND CURED PRODUCT OF SAME

(71) Applicant: MITSUBISHI GAS CHEMICAL COMPANY, INC., Tokyo (JP)

(72) Inventors: Natsumi Nishimoto, Kanagawa (JP); Kazuki Kouno, Kanagawa (JP)

(73) Assignee: MITSUBISHI GAS CHEMICAL COMPANY, INC., Tokyo (JP)

(*) Notice: Subject to any disclaimer, the term of this patent is extended or adjusted under 35 U.S.C. 154(b) by 0 days.

(21) Appl. No.: 18/857,756

(22) PCT Filed: Apr. 6, 2023

(86) PCT No.: PCT/JP2023/014174
§ 371 (c)(1),
(2) Date: Oct. 17, 2024

(87) PCT Pub. No.: WO2023/210284
PCT Pub. Date: Nov. 2, 2023

(65) Prior Publication Data
US 2025/0171581 A1 May 29, 2025

(30) Foreign Application Priority Data
Apr. 25, 2022 (JP) ................. 2022-071789

(51) Int. Cl.
*C08G 59/50* (2006.01)
*C08G 59/18* (2006.01)
*C08L 61/18* (2006.01)
*C08L 63/00* (2006.01)

(52) U.S. Cl.
CPC ............ *C08G 59/50* (2013.01); *C08G 59/184* (2013.01); *C08L 61/18* (2013.01); *C08L 63/00* (2013.01)

(58) Field of Classification Search
CPC ....... C08G 59/50; C08G 59/184; C08L 61/18; C08L 63/00

USPC .......................................... 528/93
See application file for complete search history.

(56) References Cited

U.S. PATENT DOCUMENTS

| | | |
|---|---|---|
| 5,714,544 A | 2/1998 | Ohya et al. |
| 6,338,869 B1 | 1/2002 | Nakano et al. |
| 2019/0256645 A1 | 8/2019 | Asai et al. |
| 2023/0088913 A1 | 3/2023 | Kasemi et al. |

FOREIGN PATENT DOCUMENTS

| | | |
|---|---|---|
| CN | 109843969 A | 6/2019 |
| CN | 111032722 A | 4/2020 |
| EP | 4488313 A1 | 1/2025 |
| JP | H7-48499 A | 2/1995 |
| JP | 2000-26769 A | 1/2000 |
| JP | 2001-2986 A | 1/2001 |
| JP | 2001-152085 A | 6/2001 |
| WO | WO 2021/170512 A1 | 9/2021 |

OTHER PUBLICATIONS

Mizuno et al., JP 2001-152085 A machine translation in English, Jun. 5, 2001. (Year: 2001).*
Fudo Company, Ltd., "Nikanol", Feb. 2021. (Year: 2021).*
ISR for PCT/JP2023/014174, dated May 30, 2023 (w/ translation).

* cited by examiner

*Primary Examiner* — David T Karst
(74) *Attorney, Agent, or Firm* — Greenblum & Bernstein, P.L.C.

(57) ABSTRACT

An epoxy resin composition containing an epoxy resin (A), an epoxy resin curing agent (B), a solvent (C), and an aromatic hydrocarbon formaldehyde resin (D), wherein a mass ratio of a total content of component (C) and component (D) to a total content of components (B), (C), and (D), [(C+D)/(B+C+D)], is from 0.42 to 0.57, and the mass ratio of component (C) to component (D), C/D, is 1.00 or more, and a cured product thereof.

6 Claims, No Drawings

EPOXY RESIN COMPOSITION AND CURED PRODUCT OF SAME

TECHNICAL FIELD

The present invention relates to an epoxy resin composition and a cured product thereof.

BACKGROUND ART

A polyamine compound is known to be useful as an epoxy resin curing agent. An epoxy resin composition using such an epoxy resin curing agent has been widely used in paint fields such as a corrosion-resistant paint for ships, bridges, iron structures on land and sea, in civil engineering construction fields such as lining, reinforcement, crack repair materials, sealing materials, injection materials, primers, screeds, topcoats and FRP reinforcement of concrete structures, floor materials of buildings, lining of water supply and sewage systems, paving materials, and adhesives, in electrical and electronic fields such as die-attach materials and insulation sealants, in fiber reinforced plastic fields, and the like.

Further, in order to give an epoxy resin composition desired properties corresponding to the intended use, it is known to use a modified epoxy resin modified with an aromatic hydrocarbon formaldehyde resin.

For example, Patent Literature 1 discloses that a thermosetting epoxy resin composition containing an epoxy resin and a novolac-type epoxy resin modified with an aromatic hydrocarbon formaldehyde resin has excellent heat resistance, high adhesiveness, and excellent moisture resistance.

Patent Literature 2 discloses that a paint composition for heavy-duty corrosion resistance containing an epoxy resin, an amine-based curing agent, and a reaction product of an aromatic hydrocarbon formaldehyde resin and an epoxy resin in a predetermined proportion can form a coating film that has excellent corrosion resistance, water resistance, and adhesion properties, and that is lighter in color than tar, without any health and safety problems.

In the techniques disclosed in Patent Literature 1 and Patent Literature 2, an aromatic hydrocarbon formaldehyde resin is used to modify the epoxy resin, but a technique of blending an aromatic hydrocarbon formaldehyde resin into an epoxy resin composition is also known. For example, Patent Literature 3 discloses that a paint composition for heavy-duty corrosion resistance composed of an epoxy resin, an amine-based curing agent, an aromatic hydrocarbon formaldehyde resin, a pigment, and a solvent solves the problem of poor compatibility with petroleum resins without the health and safety problems caused by tar, leaves no sticky residue on the coating film, and has excellent corrosion resistance and low-temperature curability.

CITATION LIST

Patent Literature

PTL 1: JP 07-48499 A
PTL 2: JP 2000-26769 A
PTL 3: JP 2001-152085 A

SUMMARY OF INVENTION

Technical Problem

In some cases, an epoxy resin composition used for a paint, a floor material, an adhesive, a sealant, or the like is required to be able to be cured at room temperature. Further, in these applications, the cured product of the epoxy resin composition needs to have good mechanical properties. From the viewpoint of durability, as the mechanical properties of the cured product, it is desirable that the cured product have high mechanical strength and flexibility. However, for the epoxy resin compositions according to the prior art, there is still room for improvement in terms of obtaining a cured product having excellent mechanical strength and flexibility.

A problem to be solved by the present invention is to provide an epoxy resin composition that can be cured at room temperature and form a cured product having high mechanical strength and flexibility, and a cured product thereof.

Solution to Problem

The present inventors have found that an epoxy resin composition containing an epoxy resin, an epoxy resin curing agent, a solvent, and an aromatic hydrocarbon formaldehyde resin in a predetermined proportion can solve the above-described problem.

That is, the present invention relates to the following.
[1] An epoxy resin composition containing:
  an epoxy resin (A);
  an epoxy resin curing agent (B);
  a solvent (C); and
  an aromatic hydrocarbon formaldehyde resin (D),
  wherein a mass ratio of a total content of component (C) and component (D) to a total content of components (B), (C), and (D), [(C+D)/(B+C+D)], is from 0.42 to 0.57, and the mass ratio of component (C) to component (D), C/D, is 1.00 or more.
[2] A cured product of the epoxy resin composition described in [1].

Advantageous Effects of Invention

According to the present invention, it is possible to provide an epoxy resin composition that can be cured at room temperature and can form a cured product having high mechanical strength and flexibility. The epoxy resin composition is suitably used for paints, adhesives, floor materials, concrete buildings, and the like.

DESCRIPTION OF EMBODIMENTS

Epoxy Resin Composition

The epoxy resin composition of the present invention (hereinafter also simply referred to as "composition of the present invention") contains an epoxy resin (A), an epoxy resin curing agent (B), a solvent (C), and an aromatic hydrocarbon formaldehyde resin (D), wherein a mass ratio of a total content of component (C) and component (D) to a total content of components (B), (C), and (D), [(C+D)/(B+C+D)], is from 0.42 to 0.57, and the mass ratio of component (C) to component (D), C/D, is 1.00 or more.

By having the above constituents, the composition of the present invention can be cured at room temperature (hereinafter this is also simply referred to as "room temperature curability") and can form a cured product having high mechanical strength and flexibility. The reason for this is not certain, but is thought to be as follows.

For a conventional epoxy resin composition having room temperature curability, it is difficult to achieve both mechanical strength and flexibility in the cured product. In contrast, the epoxy resin composition of the present invention contains a predetermined proportion of component (C) and component (D) in addition to the epoxy resin (A) and the epoxy resin curing agent (B). As a result, in the cured product of the epoxy resin composition cured at room temperature, the component (C) and component (D) act as plasticizers, but do not excessively reduce the cured product Tg, and it is thus thought that both mechanical strength and flexibility can be achieved in the resulting cured product. Specifically, when the mass ratio [(C+D)/(B+C+D)] is in the range of 0.42 to 0.57, flexibility tends to be exhibited, and when the mass ratio C/D is 1.00 or more, it is possible to suppress a decrease in the mechanical strength of the cured product, and it is thus thought that a cured product having high mechanical strength and flexibility can be formed.

As used herein, "epoxy resin composition having room temperature curability" means an epoxy resin composition that is used by curing at room temperature, preferably from 5 to 45° C., without being heated intentionally.

In the present invention, the mechanical strength of the cured product of the epoxy resin composition is evaluated based on tensile strength and bending strength, and the flexibility is evaluated by displacement at break. The tensile strength, bending strength, and displacement at break of the cured product of the epoxy resin composition can all be measured by the methods described in the Examples.

The respective components used in the composition of the present invention will now be described.

Epoxy Resin (A)

The epoxy resin (A) (hereinafter also simply referred to as "component (A)") is not particularly limited as long as it has two or more glycidyl groups that can react with the active hydrogens in the epoxy resin curing agent (B) described later. The epoxy resin (A) may be any of a saturated or unsaturated aliphatic compound, an alicyclic compound, an aromatic compound, and a heterocyclic compound. From the viewpoint of forming a cured product having high mechanical strength and flexibility, the epoxy resin (A) is preferably an epoxy resin containing an aromatic ring or an alicyclic structure in the molecule.

Specific examples of the epoxy resin include at least one resin selected from the group consisting of an epoxy resin having a glycidylamino group derived from metaxylylenediamine, an epoxy resin having a glycidylamino group derived from paraxylylenediamine, an epoxy resin having a glycidylamino group derived from 1,3-bis (aminomethyl) cyclohexane, an epoxy resin having a glycidylamino group derived from 1,4-bis(aminomethyl)cyclohexane, an epoxy resin having a glycidylamino group derived from diaminodiphenylmethane, an epoxy resin having a glycidylamino group and/or a glycidyloxy group derived from paraaminophenol, an epoxy resin having a glycidyloxy group derived from bisphenol A, an epoxy resin having a glycidyloxy group derived from bisphenol F, an epoxy resin having a glycidyloxy group derived from phenol novolac, and an epoxy resin having a glycidyloxy group derived from resorcinol. These epoxy resins can also be used in combination of two or more thereof.

Among the above, from the viewpoint of improving room temperature curability and forming a cured product having high mechanical strength and flexibility, the epoxy resin preferably has as a main component at least one selected from the group consisting of an epoxy resin having a glycidylamino group derived from metaxylylenediamine, an epoxy resin having a glycidylamino group derived from paraxylylenediamine, an epoxy resin having a glycidyloxy group derived from bisphenol A, and an epoxy resin having a glycidyloxy group derived from bisphenol F, and from the viewpoint of forming a cured product having high mechanical strength and flexibility, and the viewpoint of availability and economy, the epoxy resin more preferably has as a main component an epoxy resin having a glycidyloxy group derived from bisphenol A.

As used herein, "main component" means that other components may be included up to a range that does not depart from the spirit of the present invention, and the main component is preferably from 50 to 100% by mass, more preferably from 70 to 100% by mass, and further preferably from 90 to 100% by mass, of the whole.

From the viewpoint of improving handling properties, the epoxy resin (A) may contain a reactive diluent in addition to the above-described epoxy resin that may be included as a main component. Examples of the reactive diluent include a low-molecular compound having at least one epoxy group, for example, an aromatic monoglycidyl ether such as phenylglycidyl ether and cresylglycidyl ether; an alkyl monoglycidyl ether such as butylglycidyl ether, hexylglycidyl ether, octylglycidyl ether, decylglycidyl ether, lauryl glycidyl ether, and tetradecylglycidyl ether; and a diglycidyl ether of an aliphatic diol, such as 1,3-propanediol diglycidyl ether, 1,4-butanediol diglycidyl ether, neopentyl glycol diglycidyl ether, and 1,6-hexanediol diglycidyl ether.

These reactive diluents can be used alone or in combination of two or more.

An epoxy equivalent weight of the epoxy resin (A) is, from the viewpoint of forming a cured product having high mechanical strength and flexibility, preferably 80 g/eq or more, more preferably 100 g/eq or more, further preferably 120 g/eq or more, and still further preferably 150 g/eq or more, and from the viewpoint of improving the handling properties of the obtained epoxy resin composition and room temperature curability, preferably 1,000 g/eq or less, more preferably 800 g/eq or less, further preferably 500 g/eq or less, and still further preferably 300 g/eq or less.

Epoxy Resin Curing Agent (B)

Examples of the epoxy resin curing agent (B) (hereinafter also simply referred to as "curing agent (B)" or "component (B)") used in the present invention include an amine-based curing agent, an acid anhydride-based curing agent, a phenol-based curing agent, and the like. One or more types of these can be used. Among them, from the viewpoint of having fast curability and excellent room temperature curability as well, the epoxy resin curing agent (B) preferably contains at least an amine-based curing agent. The content of the amine-based curing agent in the epoxy resin curing agent (B) is, from the viewpoint of improving room temperature curability, preferably 50% by mass or more, more preferably 60% by mass or more, further preferably 70% by mass or more, still further preferably 80% by mass or more, still further preferably 90% by mass or more, and still further preferably 95% by mass or more, and is 100% by mass or less.

The amine-based curing agent is not particularly limited as long as it is a compound having at least two amino groups in the molecule. Examples include a polyamine compound or a modified product thereof having at least two amino groups in the molecule.

Examples of the polyamine compound include a chain aliphatic polyamine compound such as ethylenediamine, diethylenetriamine, triethylenetetramine, tetraethylenepentamine, pentaethylenehexamine, hexamethylenediamine, 2-methylpentamethylenediamine, and trimethylhexamethylenediamine; an aromatic ring-containing aliphatic polyamine compound such as orthoxylylenediamine, metaxylylenediamine (MXDA), and paraxylylenediamine (PXDA); a polyamine compound having an alicyclic structure such as isophoronediamine (IPDA), menthenediamine, norbornanediamine, tricyclodecanediamine, adamantanediamine, diaminocyclohexane, 1,2-bis(aminomethyl)cyclohexane, 1,3-bis(aminomethyl)cyclohexane, 1,4-bis(aminomethyl)cyclohexane, 1,4-diamino-2-methylcyclohexane, 1,4-diamino-3,6-diethylcyclohexane, diaminodiethylmethylcyclohexane, 3,3'-dimethyl-4,4'-diaminodicyclohexylmethane(bis(4-amino-3-methylcyclohexyl) methane), 3,3', 5,5'-tetramethyl-4,4'-diaminodicyclohexylmethane, and 4,4'-diaminodicyclohexylmethane; an aromatic polyamine compound such as phenylenediamine, diaminodiphenylmethane, diaminodiphenyl sulfone, diethyltoluenediamine, 2,2'-diethyl-4,4'-methylenedianiline; a polyamine compound having a heterocyclic structure such as N-aminoethylpiperazine and N,N'-bis(aminoethyl) piperazine; a polyether polyamine compound, and the like.

Further, examples of a modified product of the polyamine compound include a Mannich-modified product, epoxy-modified product, Michael adduct, Michael addition/polycondensate, styrene-modified product, polyamide-modified product, and the like of the compounds described above. These can be used alone or in combination of two or more.

Among the above, from the viewpoint of improving room temperature curability and the viewpoint of forming a cured product having high mechanical strength and flexibility, the epoxy resin curing agent (B) is preferably a modified product of a polyamine compound, more preferably an epoxy-modified product of a polyamine compound, and further preferably a reaction composition containing a reaction product of a polyamine compound represented by the following formula (1) and an epoxy compound having at least one epoxy group:

$$H_2N\text{—}CH_2\text{—}A\text{—}CH_2\text{—}NH_2 \quad (1)$$

wherein A is a phenylene group or a cyclohexylene group.

Reaction composition containing a reaction product of a polyamine compound and an epoxy compound having at least one epoxy group is a product obtained by reacting the polyamine compound and the epoxy compound, and means a composition that contains, in addition to the reaction product (adduct) of the polyamine compound and an epoxy compound, by-products other than the reaction product, unreacted starting materials, and the like. Hereinafter, such reaction composition will also be simply referred to as "the reaction composition".

In formula (1), A is a phenylene group or a cyclohexylene group, and is preferably a phenylene group. Specifically, A is at least one selected from the group consisting of a 1,2-phenylene group, a 1,3-phenylene group, a 1,4-phenylene group, a 1,2-cyclohexylene group, a 1,3-cyclohexylene group, and a 1,4-cyclohexylene group, from the viewpoint of forming a cured product having a high mechanical strength, is preferably one or more selected from the group consisting of a 1,2-phenylene group, a 1,3-phenylene group, and a 1,4-phenylene group, and more preferably is a 1,3-phenylene group. As used herein, cyclohexylene group includes both the cis form and the trans form.

Specific examples of the polyamine compound represented by formula (1) include o-xylylenediamine, metaxylylenediamine (MXDA), paraxylylenediamine (PXDA), 1,2-bis(aminomethyl)cyclohexane, 1,3-bis(aminomethyl) cyclohexane, and 1,4-bis(aminomethyl)cyclohexane. Among these, at least one selected from the group consisting of o-xylylenediamine, metaxylylenediamine, and paraxylylenediamine is preferred, and metaxylylenediamine is more preferred.

The epoxy compound used in the reaction composition may be any compound having at least one epoxy group, and more preferably is a compound having two or more epoxy groups.

Specific examples of the epoxy compound include a polyfunctional epoxy resin having a glycidylamino group derived from epichlorohydrin, butyl diglycidyl ether, neopentyl glycol diglycidyl ether, 1,3-propanediol diglycidyl ether, 1,4-butanediol diglycidyl ether, 1,6-hexanediol diglycidyl ether, biphenol diglycidyl ether, dihydroxynaphthalene diglycidyl ether, dihydroxyanthracene diglycidyl ether, triglycidyl isocyanurate, tetraglycidyl glycoluril, or metaxylylenediamine, a polyfunctional epoxy resin having a glycidylamino group derived from 1,3-bis(aminomethyl) cyclohexane, a polyfunctional epoxy resin having a glycidylamino group derived from diaminodiphenylmethane, a polyfunctional epoxy resin having a glycidylamino group and/or a glycidyloxy group derived from paraaminophenol, a polyfunctional epoxy resin having a glycidyloxy group derived from bisphenol A, a polyfunctional epoxy resin having a glycidyloxy group derived from bisphenol F, a polyfunctional epoxy resin having a glycidyloxy group derived from phenol novolac, and a polyfunctional epoxy resin having two or more glycidyloxy groups derived from resorcinol. These can be used alone or in combination of two or more.

From the viewpoint of forming a cured product having high mechanical strength and from the viewpoint of curability, the epoxy compound is more preferably a compound containing an aromatic ring or an alicyclic structure in the molecule, further preferably a compound containing an aromatic ring in the molecule, and still further preferably a polyfunctional epoxy resin having a glycidyloxy group derived from bisphenol A.

The reaction composition is obtained by subjecting a polyamine compound and an epoxy compound to a ring-opening addition reaction using a known method. For example, a method may be used in which the polyamine compound is charged into a reactor, the epoxy compound is added all at once or in portions by dropwise addition or the like, and the mixture is heated and reacted. The addition reaction is preferably carried out under an inert atmosphere such as nitrogen gas.

The amounts of the polyamine compound and epoxy compound to be used are not particularly limited as long as the ratio between them is such that the resulting reaction product contains an amino group having an active hydrogen. From the viewpoint of having the resulting reaction product function as an epoxy resin curing agent, it is preferred to use an excess amount of the polyamine compound relative to the epoxy equivalent weight of the epoxy compound in the addition reaction. Specifically, the polyamine compound and epoxy compound are used so that the ratio of the number of active hydrogens in the polyamine compound relative to the number of epoxy groups in the epoxy compound (number of active hydrogens in the polyamine compound/number of epoxy groups in the epoxy compound) is preferably 50/1 to 4/1, and more preferably is 20/1 to 4/1.

The temperature and reaction time during the addition reaction can be selected as appropriate, but from the viewpoint of reaction rate, productivity, and prevention of decomposition of the starting materials, the temperature during the addition reaction is preferably from 25 to 150° C., and more preferably from 40 to 120° C. The reaction time is, once the addition of the epoxy compound is complete, preferably from 0.5 to 12 hours, and more preferably from 1 to 6 hours.

The content of the reaction composition in the epoxy resin curing agent (B) is, from the viewpoint of forming a cured product having high mechanical strength and flexibility, preferably 50% by mass or more, more preferably 60% by mass or more, further preferably 70% by mass or more, still further preferably 75% by mass or more, still further preferably 80% by mass or more, still further preferably 85% by mass or more, and still further preferably 90% by mass or more, and is 100% by mass or less.

The active hydrogen equivalent weight (AHEW) of the epoxy resin curing agent (B) is, from the viewpoint of exhibiting high curability even if the amount blended in the epoxy resin composition is small, preferably 150 or less, more preferably 120 or less, and further preferably 110 or less. On the other hand, from the viewpoint of forming a cured product having high mechanical strength and flexibility, the AHEW of the curing agent is preferably 35 or more, and more preferably 50 or more.

Solvent (C)

Examples of the solvent (C) (hereinafter also simply referred to as "component (C)") include an alcohol-based solvent, an alkylene glycol-based solvent, an ester-based solvent, a ketone-based solvent, an ether-based solvent, a hydrocarbon-based solvent, and the like.

Examples of the alcohol-based solvent include an aliphatic monoalcohol having from 1 to 10 carbon atoms, such as methanol, ethanol, 1-propanol, 2-propanol, 1-butanol, 2-butanol, pentanol, hexanol, cyclohexanol, octanol, 2-ethylhexyl alcohol, and decanol; an aromatic ring-containing monoalcohol such as benzyl alcohol; and a heterocycle-containing monoalcohol such as furfuryl alcohol and tetrahydrofurfuryl alcohol.

Examples of the alkylene glycol-based solvent include ethylene glycol, diethylene glycol, ethylene glycol monomethyl ether, diethylene glycol monomethyl ether [2-(2-methoxyethoxy) ethanol], triethylene glycol monomethyl ether [2-{2-(2-methoxyethoxy) ethoxy} ethanol], ethylene glycol monoethyl ether, diethylene glycol monoethyl ether [2-(2-ethoxyethoxy)ethanol], ethylene glycol monoisopropyl ether, diethylene glycol monoisopropyl ether, triethylene glycol monoisopropyl ether, ethylene glycol monobutyl ether, diethylene glycol monobutyl ether, triethylene glycol monobutyl ether, ethylene glycol monoisobutyl ether, diethylene glycol monoisobutyl ether, triethylene glycol monoisobutyl ether, ethylene glycol phenyl ether [phenoxyethanol], diethylene glycol phenyl ether, triethylene glycol phenyl ether, propylene glycol, dipropylene glycol, propylene glycol monomethyl ether, dipropylene glycol monomethyl ether, propylene glycol monoethyl ether, dipropylene glycol monoethyl ether, propylene glycol monoisopropyl ether, dipropylene glycol monoisopropyl ether, propylene glycol monobutyl ether, dipropylene glycol monobutyl ether, propylene glycol monoisobutyl ether, dipropylene glycol monoisobutyl ether, propylene glycol phenyl ether, dipropylene glycol phenyl ether, and the like.

Examples of the ester-based solvent include ethyl acetate, butyl acetate, and the like, and examples of the ketone-based solvent include acetone, methyl ethyl ketone, methyl isobutyl ketone, and the like.

Examples of the ether-based solvent include diethyl ether, diisopropyl ether, tetrahydrofuran, and the like, and examples of the hydrocarbon-based solvent include a hydrocarbon compound having from 6 to 12 carbon atoms, such as toluene, xylene, isooctane, and isododecane.

Among the above, from the viewpoint of the solubility of the epoxy resin (A), the epoxy resin curing agent (B), and the aromatic hydrocarbon formaldehyde resin (D), the solvent (C) is preferably at least one selected from the group consisting of the alcohol-based solvent, the alkylene glycol-based solvent, the ester-based solvent, and the hydrocarbon-based solvent, and more preferably at least one selected from the group consisting of the alcohol-based solvent and the alkylene glycol-based solvent.

Further, from the viewpoint of forming a cured product having a higher 5% weight reduction temperature, the solvent (C) has a boiling point at 1 atm of preferably 140° C. or higher, and more preferably 200° C. or higher.

Among the above, from the viewpoint of flexibility and forming a cured product having a higher 5% weight reduction temperature, it is more preferred that the solvent (C) contains at least one selected from the group consisting of benzyl alcohol, dipropylene glycol monobutyl ether, and propylene glycol phenyl ether, and further preferred that the solvent (C) contains benzyl alcohol.

The total content of the benzyl alcohol, dipropylene glycol monobutyl ether, and propylene glycol phenyl ether in the solvent (C) is, from the viewpoint of flexibility and forming a cured product having a higher 5% weight reduction temperature, preferably 50% by mass or more, more preferably 60% by mass or more, further preferably 70% by mass or more, still further preferably 75% by mass or more, still further preferably 80% by mass or more, still further preferably 85% by mass or more, and still further preferably 90% by mass or more, and is 100% by mass or less.

The content of the benzyl alcohol in the solvent (C) is, from the viewpoint of flexibility and forming a cured product having a higher 5% weight reduction temperature, preferably 50% by mass or more, more preferably 60% by mass or more, further preferably 70% by mass or more, still further preferably 75% by mass or more, still further preferably 80% by mass or more, still further preferably 85% by mass or more, and still further preferably 90% by mass or more, and is 100% by mass or less.

Aromatic Hydrocarbon Formaldehyde Resin (D)

The aromatic hydrocarbon formaldehyde resin (D) (hereinafter also simply referred to as "resin (D)" or "component (D).") is a resin obtained by reacting an aromatic hydrocarbon and formaldehyde.

Examples of the aromatic hydrocarbon include at least one selected from the group consisting of benzene, toluene, xylene, mesitylene, pseudocumene, ethylbenzene, propylbenzene, decylbenzene, cyclohexylbenzene, biphenyl, methylbiphenyl, naphthalene, methylnaphthalene, dimethylnaphthalene, ethylnaphthalene, anthracene, methylanthracene, dimethylanthracene, ethylanthracene, and binaphthyl. Among these, from the viewpoint of forming a cured product having high mechanical strength and flexibility, the aromatic hydrocarbon constituting the aromatic hydrocarbon formaldehyde resin (D) is preferably at least one selected from the group consisting of toluene, xylene, mesitylene, and pseudocumene, and more preferably is xylene. That is, the aromatic hydrocarbon formaldehyde resin (D) is preferably at least one selected from the group consisting of a toluene formaldehyde resin obtained by reacting toluene and formaldehyde, a xylene formaldehyde resin obtained by reacting xylene and formaldehyde, a mesitylene formaldehyde resin obtained by reacting mesitylene and formaldehyde, and a pseudocumene formaldehyde resin obtained by reacting pseudocumene and formaldehyde, and including a xylene formaldehyde resin in the aromatic hydrocarbon formaldehyde resin is more preferred.

The content of the xylene formaldehyde resin in the aromatic hydrocarbon formaldehyde resin (D) is, from the viewpoint of forming a cured product having high mechanical strength and flexibility, preferably 50% by mass or more, more preferably 60% by mass or more, further preferably 70% by mass or more, still further preferably 80% by mass or more, still further preferably 90% by mass or more, and still further preferably 95% by mass or more, and is 100% by mass or less.

The viscosity of the aromatic hydrocarbon formaldehyde resin (D) at 25° C. is, from the viewpoint of forming a cured product having high mechanical strength and flexibility, preferably 30 mPa·s or more, more preferably 50 mPa·s or more, further preferably 100 mPa·s or more, still further preferably 200 mPa·s or more, and still further preferably 250 mPa·s or more. The upper limit of the viscosity is not particularly limited, but from the viewpoint of forming a cured product having high mechanical strength and flexibility, the viewpoint of maintaining good compatibility with the epoxy resin (A), and the viewpoint of handling properties, is preferably 30,000 mPa·s or less, more preferably 20,000 mPa·s or less, further preferably 15,000 mPa·s or less, still further preferably 10,000 mPa·s or less, still further preferably 8,000 mPa·s or less, still further preferably 5,000 mPa·s or less, still further preferably 2,000 mPa·s or less, still further preferably 1,000 mPa·s or less, still further preferably 800 mPa·s or less, and still further preferably 500 mPa·s or less.

The viscosity can be measured at 25° C. using an E-type viscometer, and specifically can be measured by the method described in the Examples.

The hydroxyl group equivalent weight (g/eq) of the aromatic hydrocarbon formaldehyde resin (D) is, from the viewpoint of forming a cured product having high mechanical strength and flexibility, preferably from 200 to 5,000 g/eq, more preferably from 500 to 4,000 g/eq, further preferably from 1,000 to 3,500 g/eq, and still further preferably from 1,500 to 3,000 g/eq. The hydroxyl group equivalent weight is determined by measuring the hydroxyl value by the method described in JIS K0070-1992, and converting the hydroxyl value to a hydroxyl group equivalent weight.

The aromatic hydrocarbon formaldehyde resin (D) may be a commercially available product or may be produced by a known method.

Examples of the method for producing the aromatic hydrocarbon formaldehyde resin (D) include the method described in JP 37-5747 B, and the like, in which an aromatic hydrocarbon and formaldehyde are subjected to a condensation reaction in the presence of a catalyst.

Examples of commercially available aromatic hydrocarbon formaldehyde resins (D) include "Nicanol Y-50", "Nicanol Y-100", "Nicanol Y-300", "Nicanol Y-1000", "Nicanol L", "Nicanol LL", "Nicanol LLL", "Nicanol G", "Nicanol H", "Nicanol H-80", and the like, which are xylene formaldehyde resins manufactured by Fudow Co., Ltd.

Content

The content and content ratio of each component in the epoxy resin composition is preferably in the following ranges.

The ratio between the epoxy resin (A) and the epoxy resin curing agent (B) in the epoxy resin composition is, from the viewpoint of improving room temperature curability and the viewpoint of forming a cured product having high mechanical strength and flexibility, set such that the ratio between the number of active hydrogens in the epoxy resin curing agent (B) and the number of epoxy groups in the epoxy resin (A), that is, [number of active hydrogens/number of epoxy groups] is preferably from 1/0.8 to 1/1.2, more preferably from 1/0.9 to 1/1.1, and further preferably 1/1.

The content of the epoxy resin (A) in the epoxy resin composition is, from the viewpoint of improving room temperature curability and the viewpoint of forming a cured product having high mechanical strength and flexibility, preferably from 20 to 80% by mass, more preferably from 30 to 70% by mass, and further preferably from 40 to 65% by mass.

The content of the epoxy resin curing agent (B) in the epoxy resin composition is, from the viewpoint of room temperature curability and the viewpoint of forming a cured product having high mechanical strength and flexibility, preferably from 5 to 50% by mass, more preferably from 10 to 30% by mass, and further preferably from 15 to 25% by mass. The mass ratio of the total content of component (C) and component (D) to the total content of components (B), (C), and (D), [(C+D)/(B+C+D)], in the epoxy resin composition is, from the viewpoint of forming a cured product having high mechanical strength and flexibility, from 0.42 to 0.57, preferably from 0.45 to 0.55, and further preferably from 0.47 to 0.53.

The mass ratio of component (C) to component (D), C/D, in the epoxy resin composition is, from the viewpoint of forming a cured product having high mechanical strength and flexibility, 1.00 or more, preferably from 1.00 to 3.50, more preferably from 1.20 to 3.30, further preferably from 1.20 to 3.00, still further preferably from 1.20 to 2.70, still further preferably from 1.20 to 2.50, and still further preferably from 1.30 to 2.20.

It suffices that the content of the solvent (C) in the epoxy resin composition be within a range such that the mass ratio [(C+D)/(B+C+D)] and the mass ratio C/D are satisfied, but from the viewpoint of forming a cured product having high mechanical strength and flexibility, the content of the solvent (C) in the epoxy resin composition is preferably from 1 to 30% by mass, more preferably from 2 to 20% by mass, further preferably from 3 to 20% by mass, still further preferably from 5 to 20% by mass, and still further preferably from 7 to 15% by mass.

It suffices that the content of the aromatic hydrocarbon formaldehyde resin (D) in the epoxy resin composition be within a range such that the mass ratio [(C+D)/(B+C+D)] and the mass ratio C/D are satisfied, but from the viewpoint of forming a cured product having high mechanical strength and flexibility, the aromatic hydrocarbon formaldehyde resin (D) in the epoxy resin composition is preferably from 1 to 25% by mass, more preferably from 2 to 20% by mass, further preferably from 3 to 15% by mass, still further preferably from 3 to 12% by mass, and still further preferably from 4 to 10% by mass.

Other components, such as known curing accelerators, fillers, modifying components such as plasticizers, and flow control components such as thixotropic agents, pigments, leveling agents, and tackifiers may further be blended with the epoxy resin composition of the present invention, within a range not impairing the effects of the present invention.

However, from the viewpoint of improving room temperature curability and the viewpoint of forming a cured product having high mechanical strength and flexibility, it is preferred that the epoxy resin composition of the present invention have a low pigment content. The content of the pigment in the epoxy resin composition is preferably less than 5% by mass, more preferably less than 2% by mass, further preferably less than 1% by mass, still further preferably less than 0.1% by mass, and still further preferably 0% by mass.

Further, the epoxy resin composition of the present invention is preferably a non-aqueous epoxy resin composition, and preferably has a low water content. The content of water in the epoxy resin composition is preferably less than 10% by mass, more preferably less than 5% by mass, further preferably less than 2% by mass, still further preferably less than 1% by mass, still further preferably less than 0.1% by mass, and still further preferably 0% by mass. As used herein, water content refers to the amount of water intentionally added to the epoxy resin composition, and does not exclude the presence of a small amount of water as an impurity.

The total content of the epoxy resin (A), epoxy resin curing agent (B), solvent (C), and aromatic hydrocarbon formaldehyde resin (D) in the epoxy resin composition is preferably 50% by mass or more, more preferably 60% by mass or more, further preferably 70% by mass or more, still further preferably 80% by mass or more, still further preferably 90% by mass or more, and still further preferably 95% by mass or more, and is 100% by mass or less.

Method for Producing Epoxy Resin Composition

There are no particular limitations on the method for producing the epoxy resin composition, and the epoxy resin composition can be prepared by mixing components (A) to (D) and the other optionally-used components using known methods and equipment. There is no particular restriction on the mixing order of each component contained in the epoxy resin composition, but from the viewpoint of improving handling properties, it is preferred to prepare a solution of the epoxy resin curing agent (B) dissolved in the solvent (C) in advance, and then mix the solution with component (A) and component (D).

The temperature and time at which each of the components contained in the epoxy resin composition are mixed can be adjusted as appropriate, but from the viewpoint of suppressing an increase in viscosity, the mixing temperature is preferably 80° C. or lower, and more preferably 50° C. or lower, and from the viewpoint of the miscibility of the epoxy resin, the temperature is preferably 15° C. or higher, and more preferably 20° C. or higher. Further, the mixing time is preferably in the range of 0.1 to 20 minutes, and more preferably 1 to 10 minutes.

Cured Product

A cured product of the epoxy resin composition of the present invention is obtained by curing the composition of the present invention by a known method. The curing conditions of the epoxy resin composition are appropriately selected according to the use and form, and the curing is carried out by a known method at a temperature and time sufficient to cure the epoxy resin composition. For example, for a use requiring room temperature curability, it is preferred that the curing conditions for the epoxy resin composition be selected such that the curing temperature is from 5 to 45° C. and the curing time is from 1 hour to 10 days. However, as long as the solvent (C) does not overly volatilize, a curing temperature and curing time outside the above range may be adopted. Further, after being cured at room temperature, the cured product may also be subjected to post-curing at a curing temperature and curing time outside the above range.

The form of the cured product is also not particularly limited, and may be selected according to the use. For example, when the epoxy resin composition is for various paint uses, the cured product is usually a film-like cured product.

Use

The epoxy resin composition of the present invention has room temperature curability, and is capable of forming a cured product having high mechanical strength and flexibility, and thus can be used in a paint, an adhesive, a floor material, a sealant, a polymer cement mortar, a gas barrier coating, a primer, a screed, a top coat, a sealing material, a concrete building, a crack repair material, a road paving material, and the like, and in particular, can be suitably used in a paint, an adhesive, a floor material, a concrete building, and the like.

EXAMPLES

Hereinafter, the present invention will be described in detail with reference to Examples and Comparative Examples, but the present invention is not limited to the following Examples. In addition, the various measurements and evaluations in the Examples were performed by the following methods.

Viscosity Measurement

The viscosity of the component (D) at 25° C. was measured using an E-type viscometer "TVE-22H-type viscometer cone plate type" (manufactured by Toki Sangyo Co., Ltd.).

Measurement of Tensile Strength, Bending Strength, and Displacement at Break

The epoxy resin composition obtained in each example was poured between two aluminum plates, cured for 7 days at 23° C. and 50% RH, and then heated at 80° C. for 1 hour to obtain a 4 mm-thick cured product of the epoxy resin composition. The cured product was then cut into a test piece in accordance with the following JIS standards using a cutting machine, and the tensile strength, bending strength, and displacement at break were measured using an Autograph (manufactured by Shimadzu Corporation) under the following conditions. In each measurement, a larger value indicates a better result.

Tensile strength: A tensile test was conducted at a temperature of 23° C. and a test speed of 5 mm/min in accordance with JIS K7161-1:2014 and JIS K7161-2:2014, and the tensile strength was measured.

Bending strength and displacement at break: A bending test was conducted at a temperature of 23° C. in accordance with JIS K7171:2016, and the bending strength and displacement at break were measured.

Measurement of Glass Transition Temperature (Tg)

Approximately 5 mg of the epoxy resin composition obtained in each example was cured for 7 days at 23° C. and 50% RH. The cured product was heated from −10 to 100° C. using a differential scanning calorimeter ("DSC25" manufactured by TA Instruments) at a heating rate of 1° C./min, and the Tg of the cured product was determined.

Measurement of 5% Weight Reduction Temperature

Approximately 15 mg of the epoxy resin composition obtained in each example was cured for 7 days at 23° C. and 50% RH. The cured product was heated from 25 to 300° C. using a thermogravimetric analyzer ("TG/DTA6200" manufactured by Seiko Instruments Inc.) at a nitrogen gas flow rate of 50 mL/min and a heating rate of 10° C./min, and the temperature at which the weight had decreased by 5% by mass was taken as the 5% weight reduction temperature.

Production Example 1 (Production of a Reaction Composition (MXDA-jER828 Reaction Composition) Solution Containing a Reaction Product of Metaxylylenediamine and an Epoxy Compound)

179 g of metaxylylenediamine (manufactured by Mitsubishi Gas Chemical Company, Inc., MXDA) was charged into a separable flask having an internal volume of 1 liter equipped with a stirrer, a thermometer, a nitrogen inlet tube, a dropping funnel, and a cooling tube, and while stirring the mixture under a nitrogen stream, 121 g of a polyfunctional epoxy resin having a glycidyloxy group derived from bisphenol A ("jER828" manufactured by Mitsubishi Chemical Corporation, epoxy equivalent weight: 186 g/eq) was added dropwise (in an amount such that number of active hydrogens in the metaxylylenediamine/number of epoxy groups in the epoxy compound=8/1) as an epoxy compound over 2 hours. After the dropwise addition was complete, the temperature was raised to 80° C. and a reaction was carried out for 2 hours to obtain a MXDA-jER828 reaction composition. Benzyl alcohol as the solvent (C) was added thereto in an amount of 40% by mass of the total amount to dilute the solution, thereby obtaining a reaction composition solution having a reaction composition concentration of 60% by mass. The active hydrogen equivalent weight (AHEW) of the reaction composition solution (total amount including benzyl alcohol) was 109.8.

Example 1 (Preparation and Evaluation of Epoxy Resin Composition)

As the epoxy resin (A), a liquid epoxy resin having a glycidyloxy group derived from bisphenol A ("jER828" manufactured by Mitsubishi Chemical Corporation, epoxy equivalent weight: 186 g/eq) was used, and as a mixture of the epoxy resin curing agent (B) and solvent (C), the MXDA-jER828 reaction composition solution obtained in Production Example 1 was used. Further, as component (D), a xylene formaldehyde resin ("Nicanol Y-300" manufactured by Fudow Co., Ltd.) was used.

The above-described components (A) to (D) were blended in the amounts shown in Table 1, and stirred and mixed at 23° C. to prepare an epoxy resin composition. The ratio of the number of active hydrogens in the epoxy resin curing agent (B) to the number of epoxy groups in the epoxy resin (A) (number of active hydrogens in the epoxy resin curing agent (B)/number of epoxy groups in the epoxy resin (A)) was set to 1/1.

Various evaluations were conducted on the obtained epoxy resin composition using the methods described above. The results are shown in Table 1.

Examples 2 to 4 and Comparative Examples 1 to 4

Epoxy resin compositions were prepared and the various evaluations described above were performed in the same manner as in Example 1, except that the blended components and the blended amounts in the epoxy resin composition were changed as shown in Table 1. The results are shown in Table 1. All of the amounts listed in Table 1 are active amounts.

TABLE 1

| | | | | Example 1 | Example 2 | Example 3 | Example 4 | Comparative Example 1 |
|---|---|---|---|---|---|---|---|---|
| Composition blend | Epoxy resin (A) | jER828 *1 | parts by mass | 133.6 | 149.3 | 133.6 | 133.6 | 133.6 |
| | Epoxy resin curing agent (B) | MXDA-jER828 reaction composition*2 | parts by mass | 47.4 | 53.0 | 47.4 | 47.4 | 47.4 |
| | Solvent (C) | Benzyl alcohol | parts by mass | 31.5 | 35.2 | — | 31.5 | 52.6 |
| | | Propylene glycol phenyl ether | parts by mass | — | — | 31.5 | — | — |
| | Aromatic hydrocarbon formaldehyde resin (D) | Y-300 *3 | parts by mass | 21.0 | 11.7 | 21.0 | — | — |
| | | Y-100 *4 | parts by mass | — | — | — | 21.0 | — |
| | | Y-50 *5 | parts by mass | — | — | — | — | — |
| | Total | | parts by mass | 233.6 | 249.3 | 233.6 | 233.6 | 233.6 |
| Component (A) content | | | % by mass | 57.2 | 59.9 | 57.2 | 57.2 | 57.2 |
| Component (B) content | | | % by mass | 20.3 | 21.3 | 20.3 | 20.3 | 20.3 |
| Component (C) content | | | % by mass | 13.5 | 14.1 | 13.5 | 13.5 | 22.5 |
| Component (D) content | | | % by mass | 9.0 | 4.7 | 9.0 | 9.0 | 0.0 |
| (C + D)/(B + C + D) | | | — | 0.53 | 0.47 | 0.53 | 0.53 | 0.53 |
| C/D | | | — | 1.50 | 3.00 | 1.50 | 1.50 | — |
| Evaluation results | Mechanical strength | Tensile strength | MPa | 39.6 | 49.1 | 45.4 | 31.2 | 23.1 |
| | | Bending strength | MPa | 53.1 | 79.8 | 77.0 | 61.6 | 38.9 |
| | Flexibility | Displacement at break | mm | >20 | 19.6 | >20 | >20 | >20 |
| | Heat resistance | Tg | | 32 | 41 | 38 | 37 | 27 |
| | | 5% Weight reduction temperature | ° C. | 161 | | 153 | | 135 |

TABLE 1-continued

|  |  |  | | Comparative Example 2 | Comparative Example 3 | Comparative Example 4 |
|---|---|---|---|---|---|---|
| Composition blend | Epoxy resin (A) | jER828 *1 | parts by mass | 120.5 | 169.5 | 169.5 |
|  | Epoxy resin curing agent (B) | MXDA-jER828 reaction composition*2 | parts by mass | 42.8 | 60.1 | 60.1 |
|  | Solvent (C) | Benzyl alcohol | parts by mass | 28.5 | 19.9 | — |
|  |  | Propylene glycol phenyl ether | parts by mass | — | — | — |
|  | Aromatic hydrocarbon formaldehyde resin (D) | Y-300 *3 | parts by mass | 28.8 | — | — |
|  |  | Y-100 *4 | parts by mass | — | — | — |
|  |  | Y-50 *5 | parts by mass | — | 19.9 | 39.9 |
|  | Total |  | parts by mass | 220.5 | 269.5 | 269.5 |
| Component (A) content |  |  | % by mass | 54.7 | 62.9 | 62.9 |
| Component (B) content |  |  | % by mass | 19.4 | 22.3 | 22.3 |
| Component (C) content |  |  | % by mass | 12.9 | 7.4 | 0.0 |
| Component (D) content |  |  | % by mass | 13.0 | 7.4 | 14.8 |
| (C + D)/(B + C + D) |  |  | — | 0.57 | 0.40 | 0.40 |
| C/D |  |  |  | 0.99 | 1.00 | 0.00 |
| Evaluation results | Mechanical strength | Tensile strength | MPa | 21.8 | 20.3 | not compatible |
|  |  | Bending strength | MPa | 30.9 | 104.9 |  |
|  | Flexibility | Displacement at break | mm | >20 | 11.6 |  |
|  | Heat resistance | Tg |  |  | 12 | 49 |
|  |  | 5% Weight reduction temperature | ° C. |  |  |  |

The components listed in the table 1 are as follows.

Epoxy Resin (A)

1 jER828: Liquid epoxy resin having a glycidyloxy group derived from bisphenol A, "jER828" manufactured by Mitsubishi Chemical Corporation, epoxy equivalent weight: 186 g/eq Epoxy Resin Curing Agent (B)

2 MXDA-jER828 reaction composition: Reaction composition obtained in Production Example 1 (amount excluding benzyl alcohol)

Aromatic Hydrocarbon Formaldehyde Resin (D)

3 Y-300: Xylene formaldehyde resin, "Nicanol Y-300" manufactured by Fudow Co., Ltd., viscosity at 25° C.: 285 mPa·s, hydroxyl group equivalent weight: 2,805 g/eq (hydroxyl value: 20 mgKOH/g)

4 Y-100: Xylene formaldehyde resin, "Nicanol Y-100" manufactured by Fudow Co., Ltd., viscosity at 25° C.: 109 mPa·s, hydroxyl group equivalent weight: 2,244 g/eq (hydroxyl value: 25 mgKOH/g)

5 Y-50: Xylene formaldehyde resin, "Nicanol Y-50" manufactured by Fudow Co., Ltd., viscosity at 25° C.: 50 mPa·s, hydroxyl equivalent weight: 2,805 g/eq (hydroxyl value: 20 mgKOH/g)

As shown in Table 1, the epoxy resin compositions of the Examples can be cured at 23° C., and the cured products thereof have high mechanical strength, with a tensile strength of 30 MPa or more and a bending strength of 50 MPa or more, as well as good flexibility.

A comparison between Example 1 and Example 3 shows that when the solvent (C) is benzyl alcohol, compared with when the solvent (C) is propylene glycol phenyl ether, the 5% weight reduction temperature is higher and heat resistance is better.

In contrast, the cured products of the epoxy resin compositions of Comparative Examples 1 to 3 were inferior in either mechanical strength or flexibility. In addition, the various components of the epoxy resin composition of Comparative Example 4 were not compatible with each other, and evaluation could not be performed.

Industrial Applicability

According to the present invention, it is possible to provide an epoxy resin composition that can be cured at room temperature and is capable of forming a cured product having high mechanical strength and flexibility. This epoxy resin composition can be suitably used in a paint, a floor material, and a concrete building, as well as in adhesive uses and the like.

The invention claimed is:

1. An epoxy resin composition comprising:

an epoxy resin (A);

an epoxy resin curing agent (B);

a solvent (C); and an aromatic hydrocarbon formaldehyde resin (D), wherein:

a mass ratio of a total content of component (C) and component (D) to a total content of components (B), (C), and (D), [(C+D)/(B+C+D)], is from 0.42 to 0.57, and the mass ratio of component (C) to component (D), C/D, is 1.00 or more;

a content of the epoxy resin (A) is 30 to 70 mass % and a content of the epoxy resin curing agent (B) is 5 to 50 mass % in the epoxy resin composition;

the epoxy resin curing agent (B) comprises a reaction composition comprising a reaction product of a polyamine compound represented by the following formula (1) and an epoxy compound having at least one epoxy group:

$$H_2N-CH_2-A-CH_2-NH_2 \quad (1)$$

wherein A is a phenylene group or a cyclohexylene group; and the epoxy compound having at least one epoxy group comprises an epoxy compound containing an aromatic ring or an alicyclic structure in the molecule.

2. The epoxy resin composition according to claim 1, wherein the solvent (C) comprises at least one selected from the group consisting of benzyl alcohol, dipropylene glycol monobutyl ether, and propylene glycol phenyl ether.

3. The epoxy resin composition according to claim 1, wherein the aromatic hydrocarbon formaldehyde resin (D) has a viscosity at 25° C. of 100 mPa·s or more.

4. The epoxy resin composition according to claim 1, wherein the aromatic hydrocarbon constituting the aromatic hydrocarbon formaldehyde resin (D) is at least one selected from the group consisting of toluene, xylene, mesitylene, and pseudocumene.

5. The epoxy resin composition according to claim 1, wherein the mass ratio C/D is from 1.00 to 3.50.

6. A cured product of the epoxy resin composition according to claim 1.

* * * * *